United States Patent [19]

Sakemoto et al.

[11] Patent Number: 5,007,039
[45] Date of Patent: Apr. 9, 1991

[54] OPTICAL INFORMATION RECORDING/REPRODUCING APPARATUS

[75] Inventors: Akito Sakemoto; Hitoshi Watanabe, both of Ibaraki; Yasunori Kanazawa, Hachioji, all of Japan

[73] Assignee: Hitachi Maxell, Ltd., Osaka, Japan

[21] Appl. No.: 247,854

[22] Filed: Sep. 22, 1988

[30] Foreign Application Priority Data

Sep. 22, 1987 [JP] Japan .................. 62-236294

[51] Int. Cl.[5] ........................... G11B 7/125
[52] U.S. Cl. .................... 369/116; 369/121; 369/124
[58] Field of Search ............ 369/54, 121, 58, 124, 369/116, 106, 110, 100

[56] References Cited

U.S. PATENT DOCUMENTS

| | | | |
|---|---|---|---|
| 4,494,226 | 1/1985 | Hazel et al. | 369/58 |
| 4,538,257 | 8/1985 | Klinger | 369/116 |
| 4,564,931 | 1/1986 | O'Hara et al. | 369/110 |
| 4,787,077 | 11/1988 | Barton et al. | 369/100 |
| 4,811,329 | 3/1989 | Shikama et al. | 369/116 |

FOREIGN PATENT DOCUMENTS 57-162137 10/1982 Japan .
60-048806 10/1985 Japan .

Primary Examiner—Stuart S. Levy
Assistant Examiner—Hoa Nguyen

[57] ABSTRACT

An optical information recording/reproducing apparatus includes signal recording means for recording a signal on a film. The signal is recorded by raising the temperature of the film with a writing laser beam. A signal reproduction apparatus reproduces the signal by irradiating the film with a reading laser beam. There is an optical system provided in common to both the writing laser beam and the reading laser beam. The signal recorded on the film is reproduced substantially simultaneously with the recording of the signal in order to allow for confirmation of the signal that has been recorded. A modulating circuit is provided for modulating the intensity of the writing laser beam with a frequency of at least twice as high as the maximum frequency of the signal to be recorded.

8 Claims, 11 Drawing Sheets

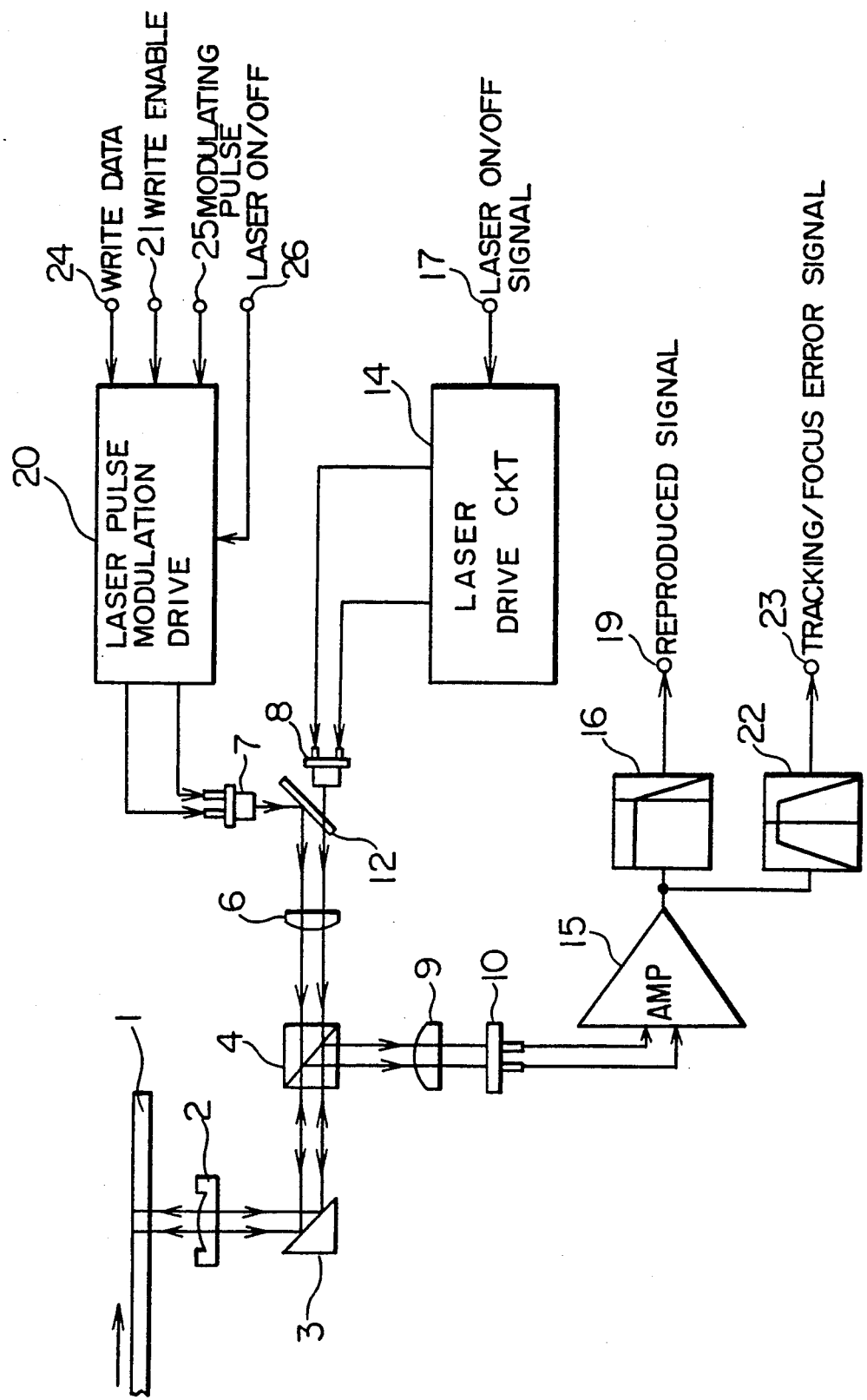

OPTICAL INFORMATION RECORDING/REPRODUCING APPARATUS

BACKGROUND OF THE INVENTION

The present invention relates to an optical information (or data) recording/reproducing apparatus which is capable of confirming the recorded signal immediately after the signal has been recorded.

When a signal is to be recorded on a recording medium in a magnetooptical data recording/reproducing apparatus which is one species of the optical information recording/reproducing apparatus, a magnetic field is applied to a recording film of the recording medium while the recording film is illuminated with a laser beam for rising the temperature thereof (this laser beam will hereinafter be referred to as writing or heating laser). Because of the rise in temperature of the film, the coercive force of the recording film is lowered. As the result, when the coercive force of the recording film becomes lower than the intensity of the magnetic field applied to the film, the corresponding portion thereof is magnetized in the direction of the applied magnetic field. It is thus possible to record on the recording film a signal consisting of a bit-based pattern containing a train of bits "1" and "0" by magnetizing previously the recording film in a predetermined direction and applying the magnetic field to the recording film in the direction opposite to that of the magnetization while the intensity of the laser beam is modulated with the signal consisting of the bit pattern mentioned above. Alternatively, the direction of the applied magnetic field may be reversed for each of the bits "1" and "0" with the intensity of the laser beam being maintained constant.

In the first mentioned recording method, the preparatory uniform magnetization of the recording film in the predetermined direction is performed for the purpose of erasing the signal recorded previously in precedence to the recording of new signal. Without the preprocessing for the erasure of signal, the signal recorded previously will continue to remain in the region in which the new signal is to be recorded. In other words, the means for erasing precedently the old signal recorded previously is necessary because of the impossibility of recording the new signal in superposition to the old signal in the case of this method. In contrast, in the case of the second mentioned recording method according to which the direction of the applied magnetic field is reversed in accordance with the bit "1" or "0" of the signal to be recorded, the recording film is always magnetized in the direction of the applied magnetic field, which means that the preparatory erasure of the old signal recorded is unnecessary, allowing thus the recording in overlap.

An example of the apparatus in which the second mentioned recording method is used is disclosed in Japanese Patent Publication No. 48806/1985 (JP-A-60-48806). This known apparatus in which a single laser source is employed is implemented so as to be also capable of reproducing the recorded signal. More specifically, in the signal reproduction mode, a recording film of the recording medium having signal recorded thereon is illuminated with a laser beam emitted from a laser source, wherein the laser beam undergoes the Kerr effect due to the magnetization of the recording film. As the consequence, the laser beam reflected by the recording film exhibits different directions of rotation of the plane of polarization in dependence on the directions of magnetization of the recording film. Accordingly, by detecting discriminatively the directions of rotation of the plane of polarization of the reflected laser beam, an electric signal consisting of a bit pattern such as mentioned above can be derived.

Parenthetically, in order to enhance the reliability of the recording medium, it is necessary to confirm whether or not the signal of interest has correctly been recorded on the recording medium every time the signal recording is performed. This confirmation can be accomplished by actually reproducing the signal from the recording medium. However, when the single laser beam is employed both for the signal reproduction from the recording film and for rising the temperature thereof for the purpose mentioned above, as in the case of this known recording/reproducing apparatus, the confirmation of the recording by reproducing the signal is possible only after the power of laser beam is set in succession to the completed recording of the signal of interest to such a level at which the coercive force of the recording film cannot be weakened. In particular, in the case where the recording medium is in the form of a disk, the signal reproduction for the confirmation must be performed after a complete rotation of the recording disk in succession to the recording of the signal of concern. Thus, a great amount of time unavoidably intervenes between the start of the signal recording and completion of the confirmation for the correct recording of the signal. This in turn means that the signal recording process involves a great deal of time.

On the other hand, there is disclosed in Japanese Patent Application Laid-Open No. 162137/1972 (JP-A-57-162137) an optical recording/reproducing apparatus in which two laser beams are employed, wherein one of the laser beams is used for rising the temperature of the recording film (i.e. the writing or heating laser beam) with the other laser beam being used for the reproduction of the signal (this laser beam will hereinafter be referred to as the reading beam). With this known technique, it is possible to effectuate the confirmation of the recorded signal substantially simultaneously with the recording of signal by illuminating the region of the recording film with the reading laser beam immediately following the recording of the signal. A magnetooptical recording/reproducing apparatus which is implemented on the basis of the concept disclosed in the patent application cited just above is shown in FIG. 1 of the accompanying drawings. Discussion on this apparatus will be made below. In FIG. 1, reference numeral 1 denotes a recording medium, 2 denotes a focussing lens, 3 denotes a mirror, 4 denotes a beam splitter, 5 denotes a polarizer, 6 denotes a collimator, 7 denotes a laser source for rising temperature of a recording film, 8 denotes a laser source for signal reproduction, 9 and 9' denote lenses, 10 and 10' denotes detectors, 11 denotes a magnetic field modulating coil, 12 denotes a semitransparent mirror, 13 denotes an analyzer, 14 and 14' denote laser drive circuits, 15 and 15' denote amplifiers, 16 denotes a low-pass filter (LPF), 17 and 17' denote input terminals, 18 denotes a wavelength separation filter, and 19 and 19' denote output terminals.

In operation in the recording mode, predetermined voltages are applied to the input terminals 17' and 17 for activating the laser drive circuits 14' and 14, respectively, to thereby drive continuously the heating or writing laser source 7 and the reproducing or reading laser source 8. Laser light of high power emitted from the heating laser source 7 is reflected by the semi-transparent mirror 12 and subsequently collimated by the collimator 6 to a laser beam to be used for rising the temperature of the recording film (i.e. for heating the recording film). The heating or writing laser beam is then polarized by the polarizer 5 to be subsequently focussed onto the recording film of a moving recording medium through the focussing lens 2 after having passed through the beam splitter 4 and having been reflected by the mirror 3. As the result, a minute portion of the recording film is heated to a high temperature. On the other hand, the magnetic field modulating coil is supplied with a signal current with the polarity inverted in dependence on the signal bit "1", "0", as the result of which the magnetic field of the direction reversed in dependence on the signal bit "1", "0" is generated by the magnetic field modulating coil 11 and applied to the heated portion of the recording film on the recording medium 1. Thus, under the effect of the heating and the applied magnetic field, the signal is magnetically recorded on the recording film of the recording medium.

The reading laser source 8 for the signal reproduction emits laser light of low power, which is passed through the semi-transparent mirror 12 to be subsequently collimated by the collimator 6 to a reading laser beam for the signal reproduction. This reading laser beam is then focussed by the focussing lens 2 onto the recording film of the medium 1 at a position located on the recording film immediately behind the portion illuminated by the writing laser beam (as viewed in the moving direction of the recording medium) after having been transmitted along the optical path defined by the polarizer 5, beam splitter 4 and the mirror 3. In this case, the power of the reading laser beam for the signal reproduction is set at a low level at which the recording film on the recording medium 1 is protected from being heated to such a high temperature which brings about the inversion of magnetization.

FIG. 2 shows another example of the magnetooptical recording/reproducing apparatus of the magnetic field modulation type, which differs from the apparatus shown in FIG. 1 in that a quarter-wavelength plate 30, a polarized beam splitter 31 and a second detector 10-2 are additionally provided.

In operation, the recording film of the recording medium reflects a part of the writing laser beam and the reading laser beam. At that time, since the reading laser beam illuminates the portion of the recording film in which the signal is recorded, the reading laser beam undergoes the Kerr effect due to the magnetization of that portion. More specifically, the plane of polarization of the reflected reading laser beam is rotated relative to the incident beam illuminating the recording film. In that case, the direction of the rotation differs in dependence on the direction of magnetization of the recording film.

The reading laser beam reflected by the recording film on the recording medium 1 reaches the wavelength separating filters 18-1 and 18-2 by way of the focussing lens 2 and the mirror 3. The optical path defined by the collimator 6, beam splitter 4, mirror 3 and the focussing lens 2 is utilized in common to both the writing laser beam and the reading laser beam. Further, a part of the writing laser beam partially reflected by the recording film of the recording medium 1 follows the same optical path as the reflected reading laser beam. The reflected reading laser beam is utilized for confirming the recorded signal. Accordingly, the reflected reading laser beam has to be separated from the reflected writing (heating) laser beam. To this end, it is required that the wavelength of the writing (heating) laser beam differs from that of the reading laser beam. Thus, there are employed the wavelength separating filters 18-1 and 18-2. By way of example, the writing laser beam may have the wavelength of 830 nm while that of the reading laser may be 780 nm.

The optical separation filter 18-2 allows the reading laser beam to pass therethrough while reflecting the writing laser beam. The reading laser beam having passed through the optical separation filter 18-2 is separated into two orthogonal polarized light components by the polarizing beam splitter 31-2 through the lens 9-2 to be subsequently received by the detectors 10-2 and 10-3.

Thus, the detectors 10-2 and 10-3 outputs electric signals of such level which varies in dependence of the directions of magnetization of the recording film on the recording medium 1 (i.e. in dependence on the recorded signal "1" and "0"). These signals reproduced from the recording medium 1 are differentially amplified by the amplifier 15-2 and applied to the LPF 16 where noise components are eliminated. The output signal of the LPF 16 is taken out through the output terminal 19 to be utilized for confirming the recorded signal.

On the other hand, the writing laser beam reflected by the optical separation filter 18-2 is received by the detector 10-1 by way of the beam splitter 4 and the lens 9-1. The detection output signal of the detector 10-1 is amplified by the amplifier 15-1 and outputted through the output terminal 23 to be utilized in monitoring the power of the writing laser beam or as the tracking and focussing control signal.

In addition to the magnetooptical recording/reproducing apparatuses described above, the present invention concerns a write-once type recording/reproducing apparatus which is another species of the optical information recording/reproducing apparatus and in which a write-once type optical recording medium is employed instead of the magnetic recording medium.

The signal recording on the write-once type optical recording medium is accomplished by making use of the phenomenon that a recording film of this type recording medium absorbs energy of the illuminating laser beam to convert it into heat by which a spot region of the recording film illuminated with the laser beam is bored or otherwise deformed through melting, sublimation, decomposition, vaporization and the like process, whereby the information signal consisting of a bit pattern of "1" and "0" is recorded in the recording film in the form of pits. When the pit information as recorded is to be read out or reproduced, the recording film is illuminated with a reading laser spot of power sufficiently low for precluding the thermal influence to the film, wherein the recorded information is read out by detecting discriminatively the light reflection of low level originating in the pit and the reflection of high level from other region than the pit.

FIG. 3 of the accompanying drawings shows a write-once type optical recording/reproducing apparatus, which differs from the magnetooptical recording/reproducing apparatus shown in FIG. 1 in that the magnetic head 11, polarizer 5, the analyzer 13 and other associated parts are absent.

FIG. 4 shows another example of the write-once type recording/reproducing apparatus in which a write-once type optical disk is employed as the recording medium and which is implemented in the structure similar to the apparatus shown in FIG. 3 except that a control circuit for performing a tracking control on the basis of error signal involved in the tracking/focussing operation is incorporated.

As will be seen from the foregoing description, there are the optical information recording/reproducing apparatuses which are capable of confirming the signal recording simultaneously as the signal is recorded.

It is however noted that in the optical information recording/reproducing apparatus, an optical system is used in common to both the writing laser beam and the reading laser beam which differ from each other in the wavelength. Consequently, correction of aberrations is required for each of the laser beams. Besides, a filter is necessary for separating these two laser beams from each other. Under the circumstances, the optical system necessarily presents a complicated structure, making difficult the assembling and adjustment, not to speak of poor utilization efficiency of the laser beam because of presence of many parts absorbing the laser energy.

SUMMARY OF THE INVENTION

An object of the present invention is to solve the problems of the apparatuses described above and provide an optical information recording/reproducing apparatus in which the optical system is implemented in a simplified structure to thereby allow the utilization efficiency of the laser beam to be enhanced.

In view of the above and other objects which will become more apparent as description proceeds, it is taught by the present invention that the intensity of the writing laser beam is modulated with a frequency at least twice as high as the maximum frequency of the signal to be recorded to thereby allow the signal reproduced with the aid of the reading laser beam to be electrically separated so that the writing laser beam and the reading laser beam may have a same wavelength.

BRIEF DESCRIPTION OF THE DRAWINGS

FIGS. 10 and 11 are block diagrams showing arrangements of the write-once type recording/reproducing apparatuses according to further embodiments of the present invention, respectively;

DESCRIPTION OF THE PREFERRED EMBODIMENTS

Now, the present invention will be described in detail in conjunction with exemplary embodiments thereof.

Figure 1:
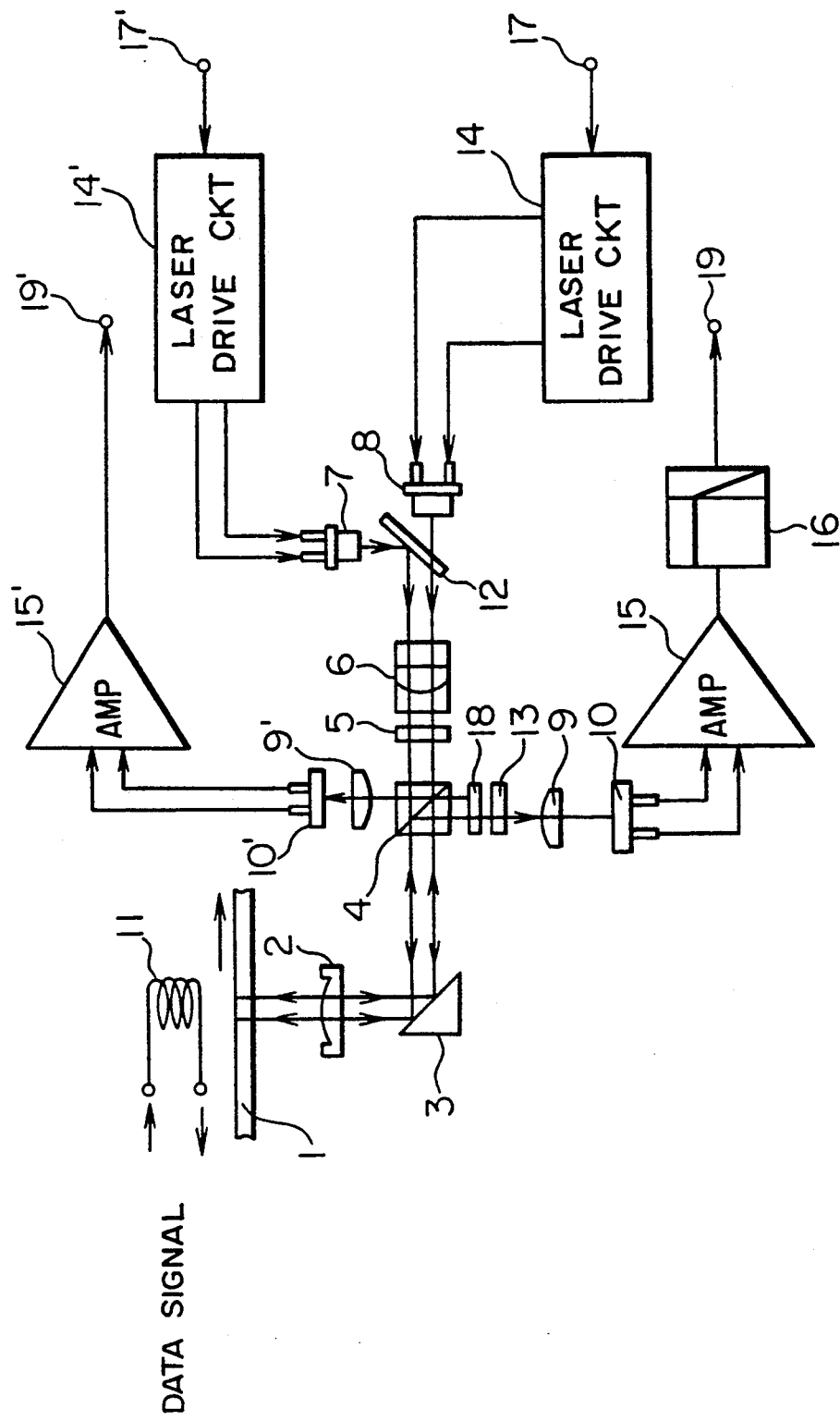
FIG. 1 is a block diagram showing a structure of a magnetooptical recording/reproducing apparatus.
Figure 5:
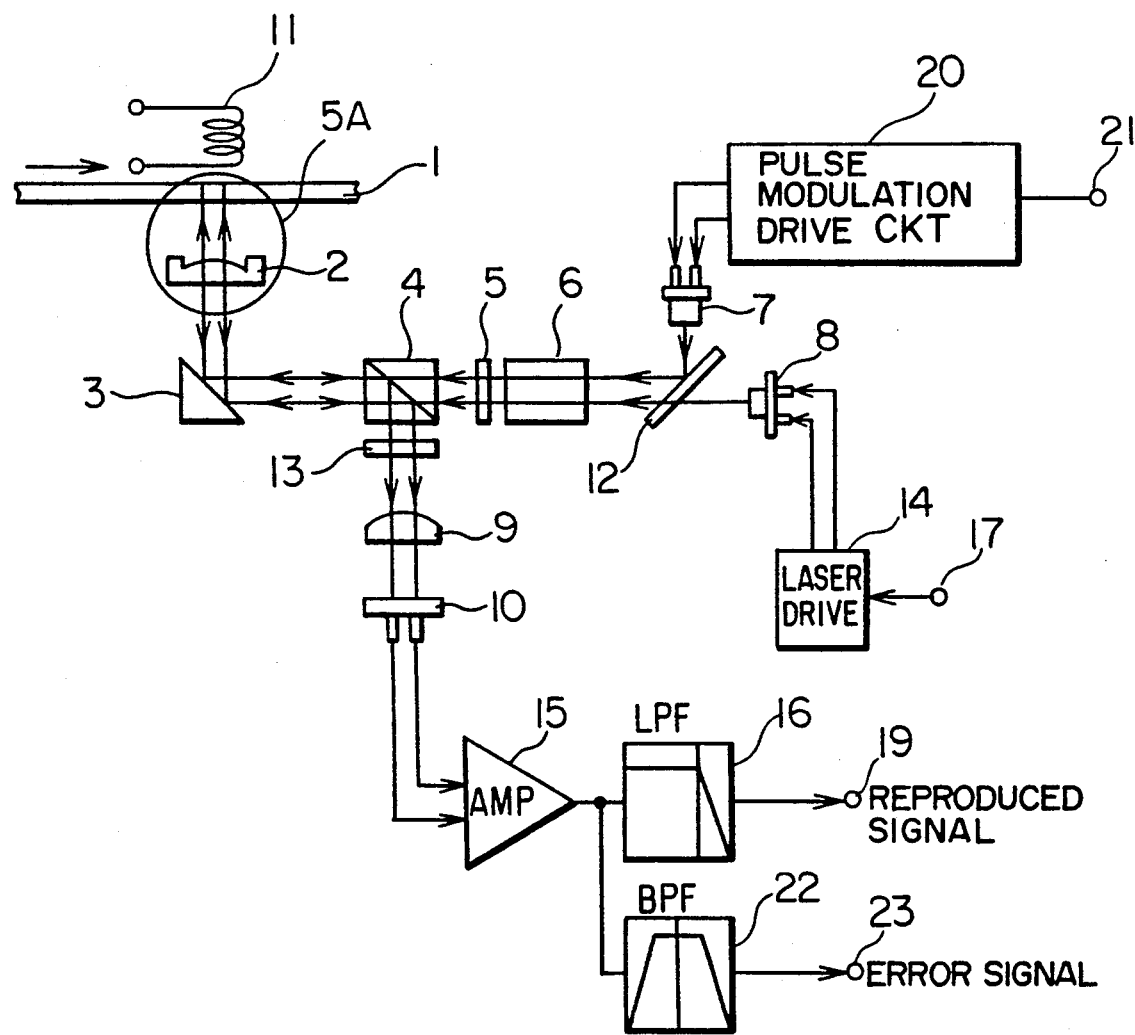
FIG. 5 is a block diagram showing a general arrangement of the magnetooptical recording/reproducing apparatus according, to an embodiment of the present invention.

FIG. 5 shows a general arrangement of the magnetooptical recording/reproducing apparatus according to an embodiment of the invention. In the figure, reference numeral 20 denotes a pulse modulation circuit, 21 denotes an input terminal, 22 denotes a band pass filter (BPF), and 23 denotes an output terminal, being understood that other parts serving for the same or equivalent functions as those shown in FIG. 1 are designated by same reference numerals.

Figure 2:
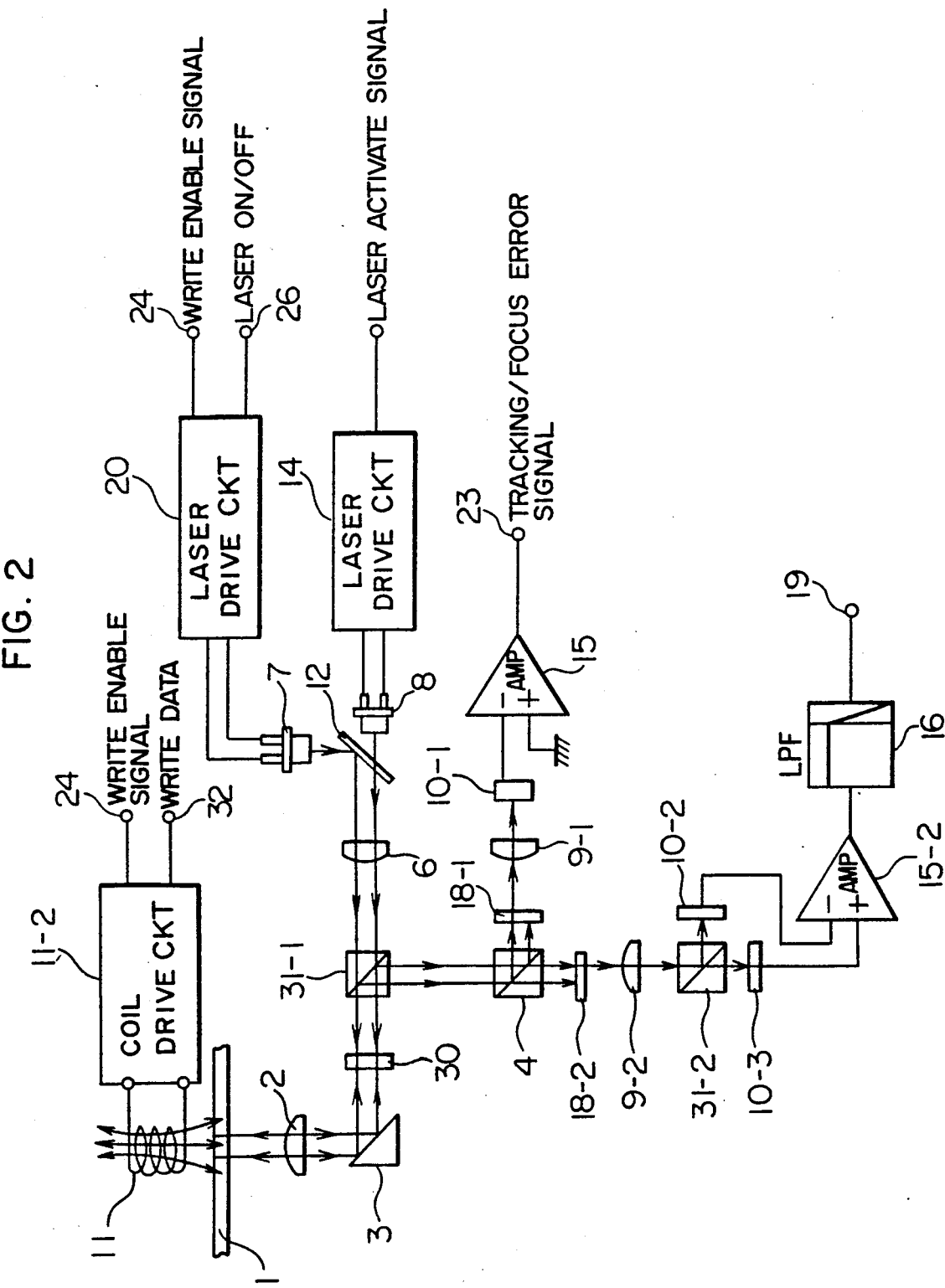
FIG. 2 is a block diagram showing a structure of a magnetooptical recording/reproducing apparatus of the magnetic field modulation type.
Figure 3:
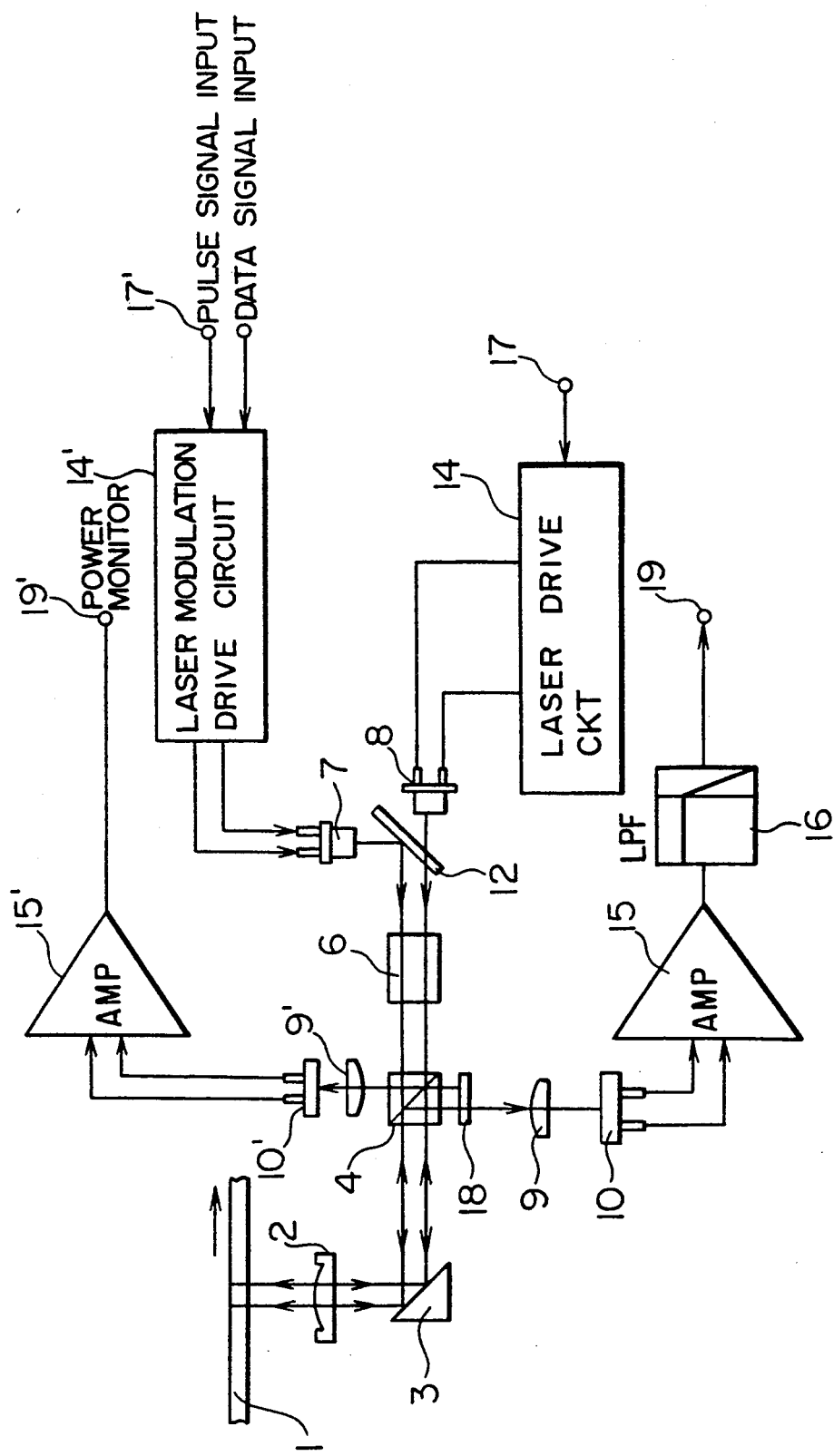
FIG. 3 is a block diagram showing a structure of a write-once type optical recording/reproducing apparatus.
Figure 4:
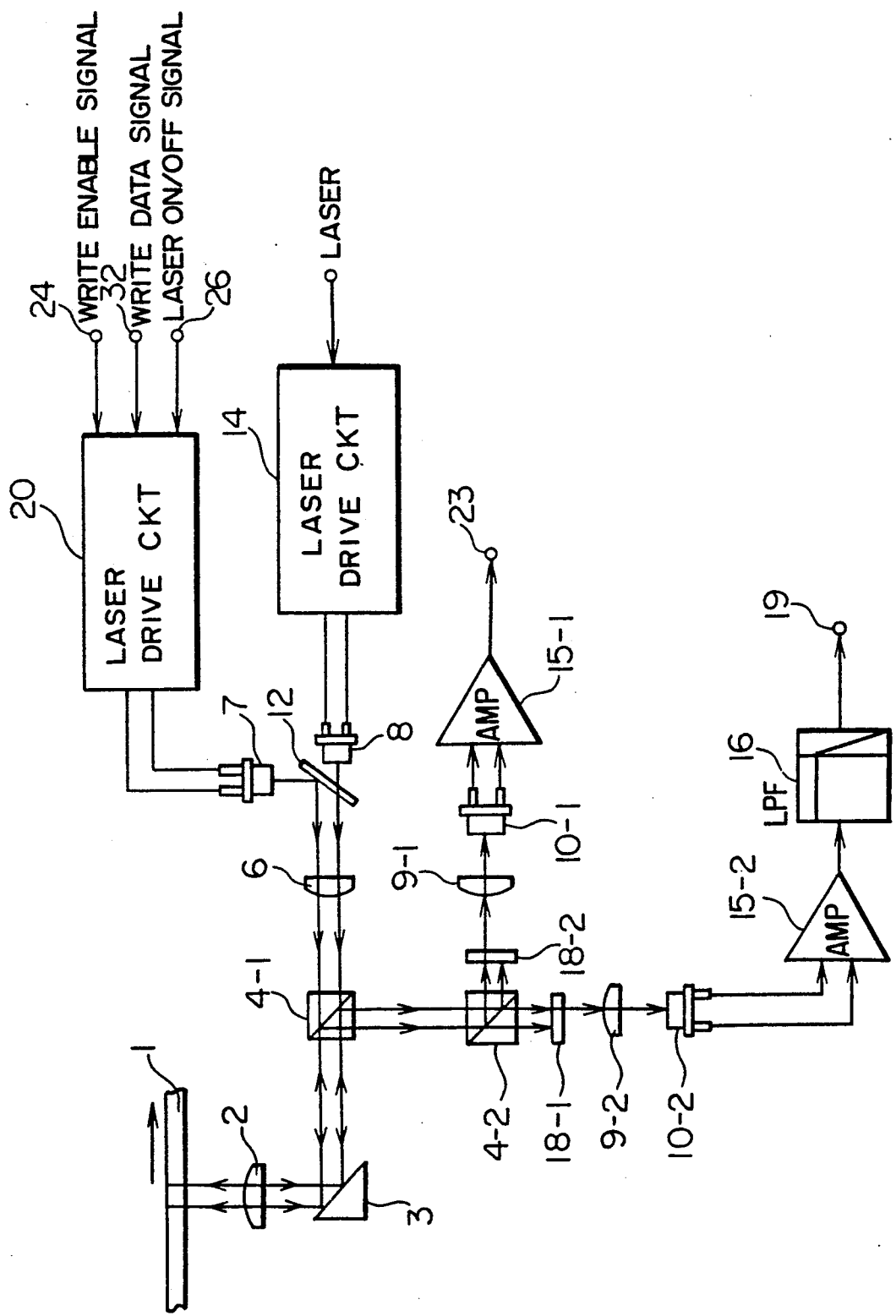
FIG. 4 is a block diagram showing another example of the write-once type optical recording/reproducing apparatus.
Figure 6:
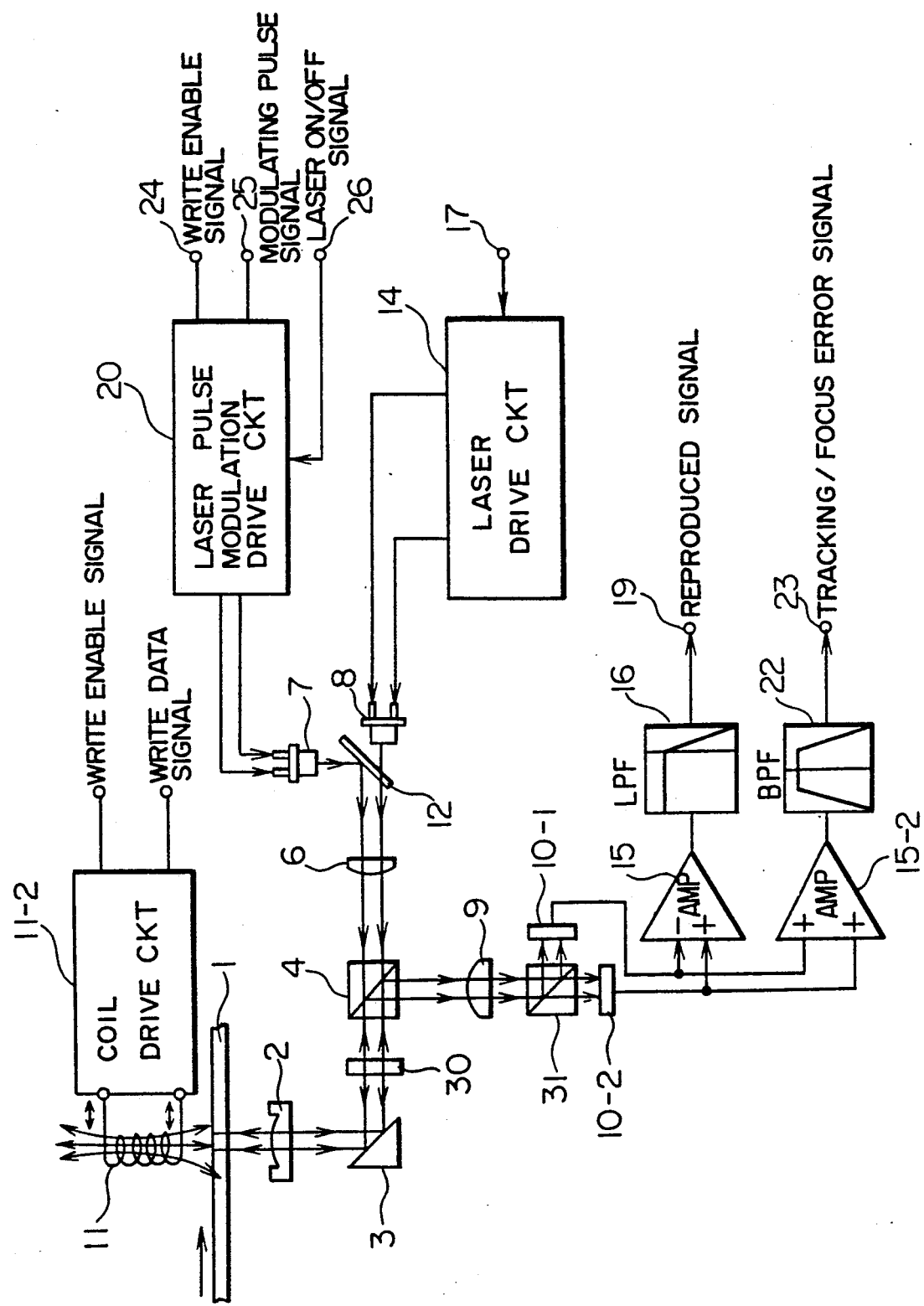
FIG. 6 is a block diagram showing a general arrangement of the magnetooptical recording/reproducing apparatus of the magnetic field modulation type according to another embodiment of the present invention.

FIG. 6 shows a general arrangement of the magnetooptical recording/reproducing apparatus of the magnetic field modulation type according to another embodiment of the present invention. In this figure, parts corresponding to those shown in FIG. 2 are designated by like reference numerals.

Referring to FIG. 5, the writing (heating) laser source (e.g. laser diode) 7 and the reading laser source 8 emit laser beams of a same wavelength. These laser beams are focussed onto a recording film of the recording medium 1 by the focussing lens 2 after having been transmitted through the semi-transparent mirror 12, collimator 6, polarizer 5, beam splitter 4 and the mirror 3. The laser beam originating in the writing (heating) laser source 7 raises the temperature of the recording film, while the recording of signal is performed by applying the magnetic field modulated by the signal through the magnetic field modulation coil 11 to the recording film. On the other hand, the reading laser beam is focussed onto the recording film in the same positional relationship to the writing laser beam as described hereinbefore by reference to FIG. 1. Although it has been assumed in the case of the illustrated apparatus that the magnetic field modulation is adopted, it should be understood that other type of laser beam modulation may equally be employed without giving rise to any material problems.

The input terminal 17 is supplied with a predetermined voltage, whereby the reading laser beam is continuously emitted from the reading laser source 8. In contrast, the input terminal 21 is supplied with a pulse voltage having a predetermined frequency. With this pulse voltage, the drive current for the writing laser source 7 is modulated by the pulse modulation circuit 20, as the result of which the writing laser beam emitted from the laser source 7 undergoes intensity modulation with the frequency of the pulse voltage mentioned above. In this connection, it will be appreciated that the recording film of the recording medium 1 can be heated even by the laser beam modulated in intensity in this manner because of thermal inertia of the recording film. The frequency with which the intensity of the writing laser is modulated is set at least twice as high as the maximum frequency of the signal to be recorded on the recording medium 1. Preferably, the modulating frequency of concern should be selected in the range of twice to five times as high as the maximum frequency of the signal to be recorded. Representing the intensity modulating frequency of the writing laser beam by $f_c$, the writing laser beam is modulated by the pulse signal having the frequency $f_c$.

A part of the writing laser beam and the reading laser beam are reflected from the recording film of the recording medium 1 to be applied to the beam splitter 4 by way of the focusing lens 2 and the mirror 3. Derived from the reading laser beam reflected from the beam splitter 4 through the analyzer 13 is a laser beam having the intensity modulated in conformance with the signal recorded on the recording medium, which laser beam is then received by the detector 10 through the lens 9. Further, a part of the writing laser beam reflected by the beam splitter 4 passes through the analyzer 13 to be detected by the detector 10 through the lens 9.

In this manner, the detector 10 outputs a mixed signal containing the modulating signal (of the frequency $f_c$) of the writing laser beam and the modulated signal of the reflected reading laser beam (i.e. the signal reproduced from the recording medium 1). The mixed signal is amplified by the amplifier 15 to be subsequently supplied to the LPF 16 and the BPF 22.

The reading laser beam received by the detector 10 is modulated in intensity by the signal recorded on the recording medium, wherein the modulated intensity components include fundamental frequency component and the harmonic components of the signal recorded on the recording medium. Consequently, the reproduced signal outputted from the detector 10 naturally contains the fundamental frequency component and the harmonic components thereof all of which constitute the recorded signal. However, the tertiary and higher harmonic components are of very low energy. Accordingly, the original signal as recorded can adequately be reconstituted only with the fundamental frequency component and the secondary harmonic component.

When the maximum frequency of the fundamental frequency signal component of the reproduced signal is represented by $f_o$, the frequency of the secondary harmonic is given by $2f_o$. Accordingly, by setting the cut-off frequency of the LPF 16 at $2f_o$, it is possible to separate the reproduced signal from the output signal of the amplifier 15. It is thus apparent that when the intensity modulating frequency $f_c$ of the writing laser beam is selected to be at least twice as high as the maximum frequency of the signal to be recorded, as described hereinbefore, it is possible to separate the modulating signal of the writing laser beam from the output signal of the amplifier 15 by setting the passing band of the band pass filter (BPF) 22 such that only the modulating frequency $f_c$ can pass therethrough. The output signal of the low-pass filter (LPF) 16 is utilized for confirming the signal recording, while the output signal of the BPF 22 can be made use of for monitoring the power of the writing laser beam.

Figure 7:
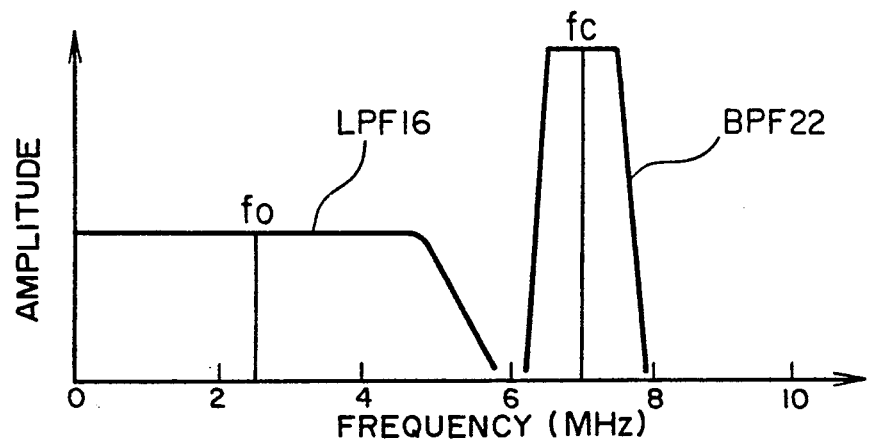
FIG. 7 is a view illustrating graphically the frequency characteristics of the detection output signals in the apparatuses shown in FIGS. 5 and 6.

FIG. 7 illustrates the characteristics of the LPF 16 and BPF 22 on the assumption that the data transfer rate of the signal to be recorded is 5 Mbits/second (i.e. $f_o = 2.5$ MHz) and that the intensity modulating frequency $f_c$ of the writing laser beam is 7 MHz.

Figure 8A:
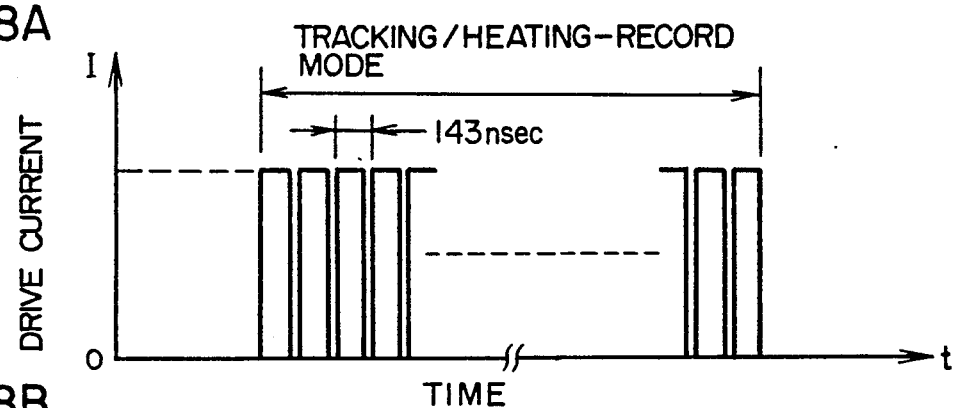
FIGS. 8A and 8B are views for illustrating characteristically the output waveforms of the writing laser beam source employed in the apparatuses shown in FIGS. 5 and 6.
Figure 8B:
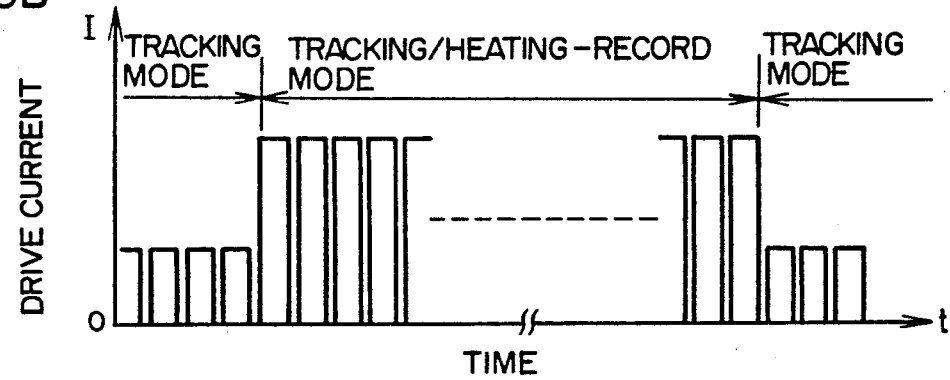

The writing laser source 7 may be activated only in the recording operation mode by supplying the pulse-like drive current, as is illustrated in FIG. 8A. Alternatively, the writing laser source 7 may be driven also in the reproduction mode with the output power being lowered, as is illustrated in FIG. 8B for the purpose of utilizing the output of writing laser source 7 for the tracking servo control.

Figure 9:
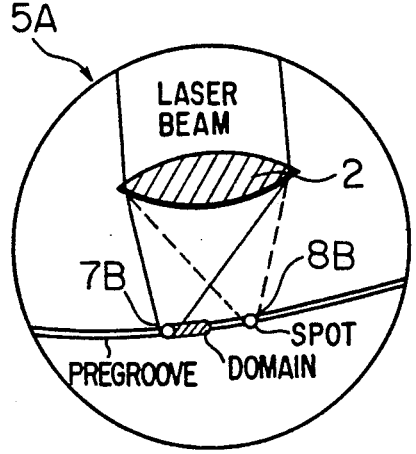
FIG. 9 is an enlarged view of a portion 5A indicated as encircled in FIG. 5.

FIG. 9 is an enlarged view of a portion indicated as enclosed by a circle 5A in FIG. 5 and shows the state in which the laser beams 7 and 8 are focussed onto the recording film of the recording medium through a lens 2 incorporated in the optical head, wherein the recording beam spot 7B and the reading laser beam spot 8B run along a track on the recording medium.

When the writing beam spot 7B is used for the pit recording, the pulse signal is generated intermittently, as will be seen in FIG. 8A. On the other hand, when the beam spot 7B is to be used also for the tracking purpose, the laser beam pulses of low and high powers are generated alternately in a continuous manner, as is shown in FIG. 8B.

As will be appreciated from the foregoing description, according to the teaching of the invention that the writing laser beam and the reading laser beam have a same wavelength, wherein the common optical system is used for both the writing laser beam and the reading laser beams, the correction of aberrations of the optical system can be facilitated. Further, since there exists no need for separation of these laser beams, the optical filter can be spared, whereby the optical system is correspondingly simplified in the structure. Besides, the utilization efficiency of the laser beam can be enhanced to about 35% from 25% of the prior art apparatus.

In the signal recording operation, it is important that temperature of the recording film of the recording medium 1 rises rapidly as the recording film is illuminated with the writing laser beam, while the temperature of the recording film is rapidly lowered upon interruption of the illumination. To this end, the power of the writing laser beam in the signal recording operation mode should preferably be so set that the recording film is heated only to the lowest temperature at which the magnetization of the recording film can be inverted by the magnetic field applied by the magnetic field modulation coil 11. The power of the writing laser beam depends on the peak value of the modulated intensity and the duty ratio (ratio of pulse width/period), so that as they increased, the power increases accordingly.

In recent years, various materials for the recording film of the magnetooptical recording medium have been developed. In conjunction with these materials, power of the writing laser beam has to be increased for the material having a high thermal conductivity, while the power can be lowered for the material exhibiting a low thermal conductivity. Accordingly, an inexpensive laser source of low power can be used as the writing laser source. In general, the recording films made of amorphous metals such as Tb-Fe series, Tb-Fe-Co series, Tb-Fe-Co-Nb series, Tb-Fe-Co-Nb-Pt series, Gd-Fe-Co series or the like have high thermal conductivity. On the other hand, the recording film made of oxides such as Ba-ferrite has a low thermal conductivity. In the following table, thermal properties of various materials for the recording film are listed up together with operating conditions of the writing laser beam, by way of example.

| Materials | | $T_c$ (°C.) | Recording sensitivity (nJ/μm²) | Laser Power (mW) | Laser Diode Current (mA) | Duty Ratio (%) |
| --- | --- | --- | --- | --- | --- | --- |
| Amorphous | TbFeCo | 190 | 0.4 | 7.5 | 120 | 80 |
| | TbFe | 140 | 0.3 | 6.0 | 120 | 60 |
| | GdTbFe | 160 | 0.4 | 7.5 | 120 | 80 |
| Single Crystal | BiSmYb | 153 | 10 | 250 | — | — |
| | CoGeIG | 30 | | | | |
| | GdIG | ($T_{comp}$) | 1.0 | 25 | — | — |
| Polycrystal | MnBi | 180 | 0.1 | 2.0 | 120 | 20 |
| | PtCo | 390 | 1.3 | 33 | — | — |
| | MnCuBi | 200 | 0.1 | 2.0 | 120 | 20 |
| | EuO | >180K | 0.01 | 0.2 | 120 | 2 |

$T_c$: Curiy temperature
$T_{comp}$: Compensation temperature

It should further be mentioned in conjunction with the magnetooptical recording/reproducing apparatus shown in FIG. 5 that the level of temperature to which the recording film of the recording medium 1 is heated can be made variable by varying the amplitude and the duty ratio of the pulse voltage applied to the input terminal 21. By way of example, the temperature of the recording film as heated is made low by setting the duty ratio at a small value. Of course, the duty ratio of the laser beam pulse or the power thereof may be set to optimal value for realizing the optimal temperature in consideration of the types of the materials for the recording film of the recording medium 1.

Figure 10:
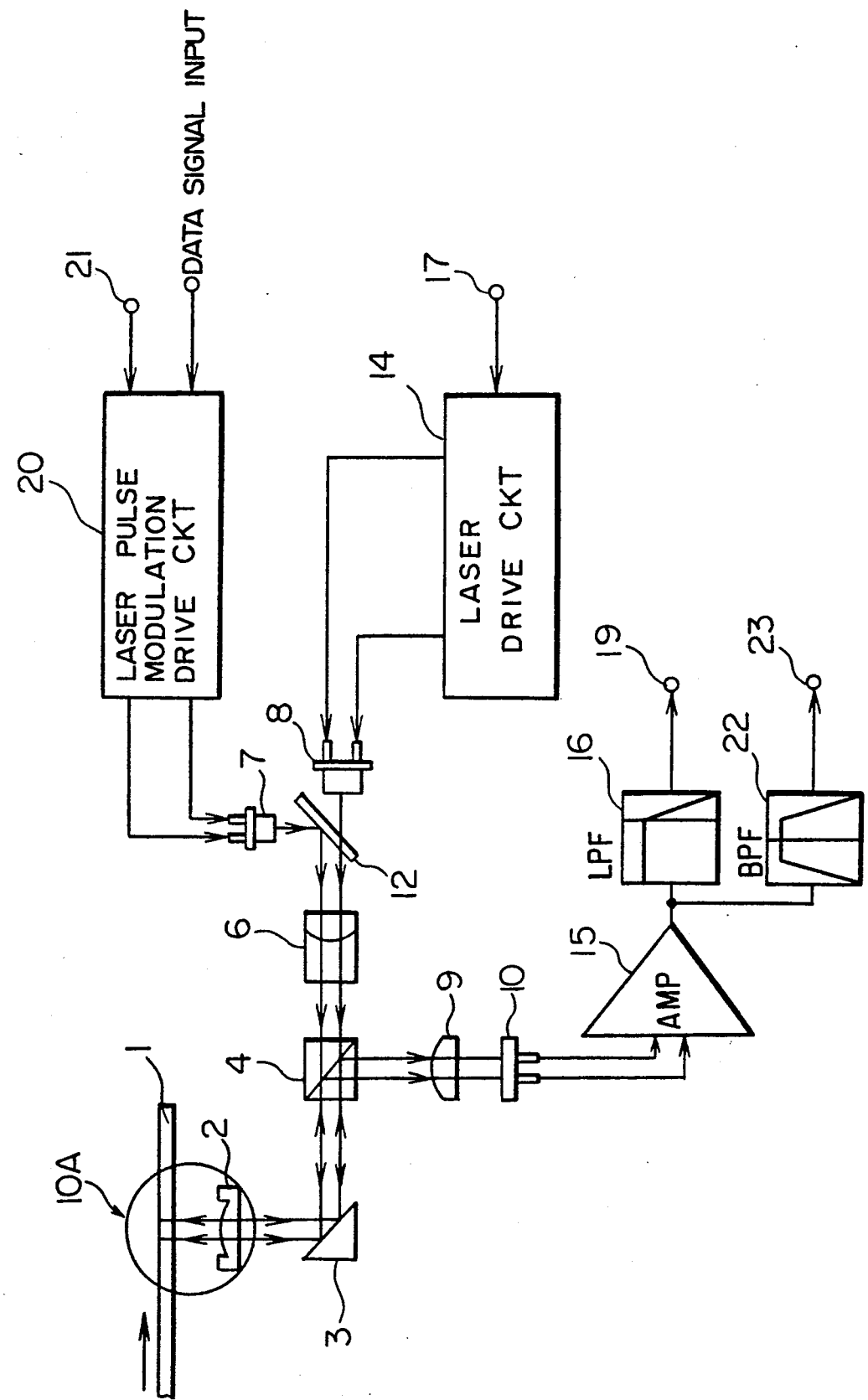

FIGS. 10 and 11 show write-once type optical recording/reproducing apparatuses according to further embodiments of the invention, respectively. The writing laser source 7 having high output power serves as the laser source for producing a recording laser spot. In this case, the laser spot beam is also modulated in intensity by the frequency of the pulse voltage mentioned above. The frequency for the intensity modulation is set at least twice as high as the maximum frequency of the signal recorded on the recording medium.

The recording film (e.g. Te-film or Te-Se-Pb alloy film) of the recording medium reflects a part of the recording laser beam and the reading laser beam. From the laser beams reflected by the recording film, the laser beam modulated in conformance with the signal recorded on the recording medium is extracted through the beam splitter 4 and applied to the detector 10 through the lens 9. Although the major component of the output signal of the detector 10 is the reflected reading laser beam modulated with the recording signal (i.e. the signal reproduced from the recording medium), a small proportion of the reflected reading laser beam modulated with the recorded signal will be applied to the LPF 16 and the BPF 22 after having been amplified by the amplifier 15. However, the reproduced signal can be separated from the output signal of the amplifier 15 by setting appropriately the cut-off frequency of the LPF 16.

Figure 12A:
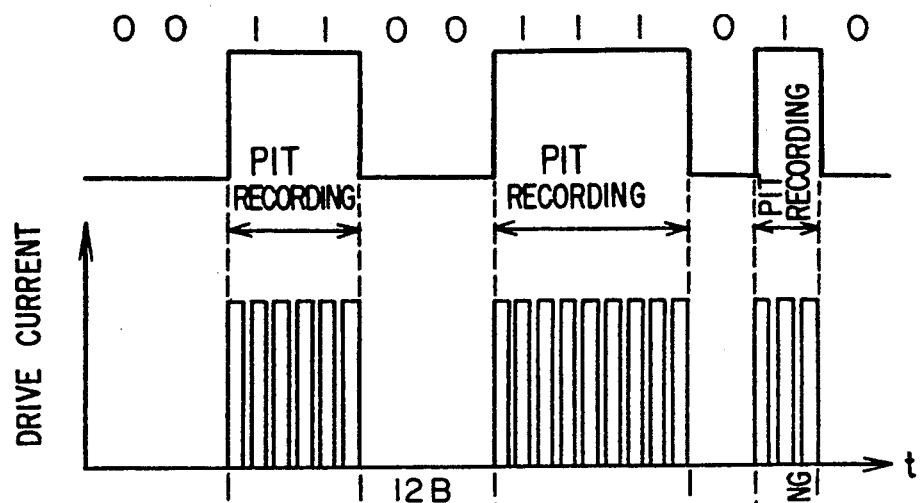
FIGS. 12A and 12B are views illustrating a signal bit pattern to be recorded and corresponding pulse drive currents, respectively.
Figure 12B:
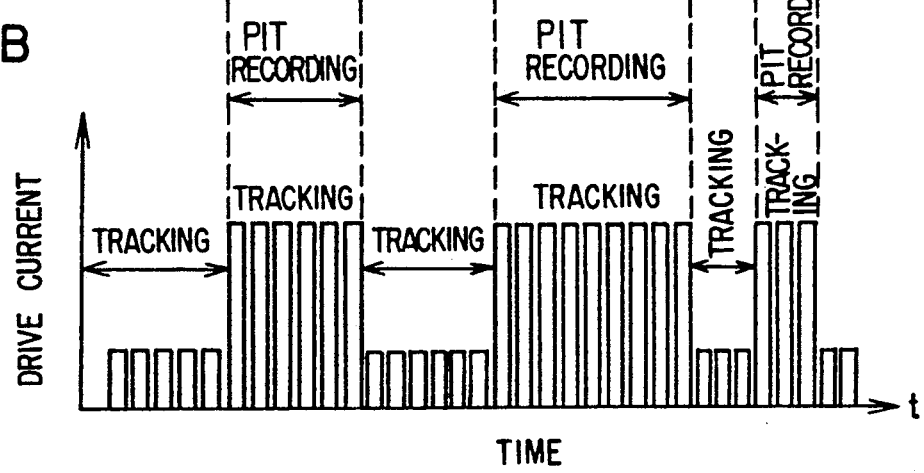
Figure 13:
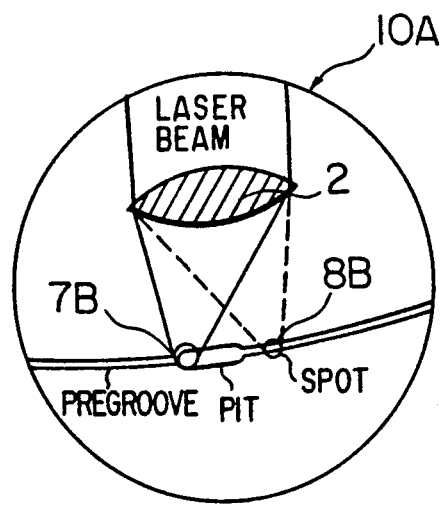
FIG. 13 is a schematic enlarged view of a portion 10A indicated as encircled in FIG. 10.
Figure 14:
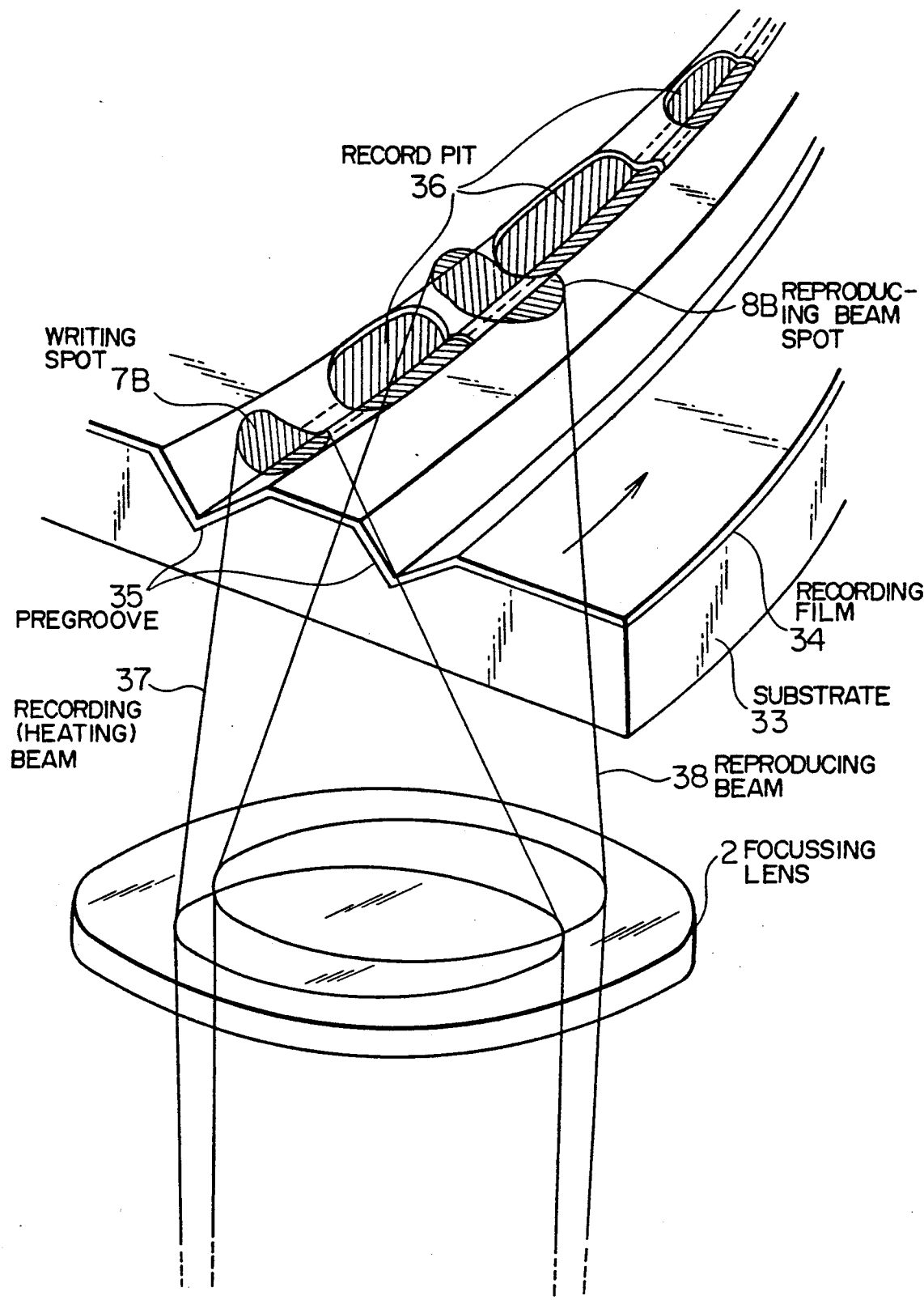
FIG. 14 is a perspective view showing the portion 10A of FIG. 10 in a further enlarged state.

FIG. 13 shows in a magnified scale the portion indicated as enclosed by a circle 10A in FIG. 10. The laser beams 7 and 8 are focussed onto the recording film of the recording medium through the lens 2 incorporated in the optical head, wherein the positional relationship between a writing beam spot 7B and a reading beam spot 8B is illustrated in FIG. 13. FIG. 14 shows a further enlarged view of FIG. 13. When the pit recording is performed with the writing beam spot 7B, the pulse signal is generated intermittently, as is illustrated in FIG. 12A. This writing beam can be made use of for the tracking control. In that case, the writing beam is continuously so generated that the low power pulse beam and the high power pulse beam alternate with each other, as illustrated in FIG. 12B.

With the arrangement described above, the present invention can also be applied to the write-once type recording/reproducing apparatus in addition to the magnetooptical recording/reproducing apparatus.

As will now be appreciated from the foregoing description, the present invention has provided the optical information recording/reproducing apparatus in which correction of aberrations is facilitated, the filter for separating the writing laser beam and the reading laser beam can be spared, the optical system is simplified with assembling and adjustment thereof being facilitated and in which the laser beam attenuating element can be spared while ensuring significant enhancement of the utilization efficiency of the laser energy, to great advantage.

We claim:

1. An optical information recording/reproducing apparatus, comprising:

signal recording means for recording a signal on a recording film of a recording medium by raising temperature of said recording film through irradiation with a writing laser beam having a predetermined wave length;

signal reproducing means for reproducing said signal by irradiating with a reading laser beam the recording film of said recording medium in which said signal is recorded;

an optical system provided in common to both said writing laser beam and said reading laser beam;

the signal recorded on said recording film being reproduced substantially simultaneously with the recording of said signal through said signal reproducing means for allowing confirmation of said signal having been recorded; and means for modulating intensity of said writing laser beam determined by said signal to be recorded with a frequency at least twice as high as the maximum frequency of said signal to be recorded.

2. An optical information recording/reproducing apparatus according to claim 1, wherein the power of said writing laser beam with which said recording film is irradiated is set in dependence on properties of the recording film of said recording medium.

3. An optical information recording/reproducing apparatus according to claim 2, further including a single detector for receiving both of said writing laser beam and said reading laser beam reflected by the recording film of said recording medium, and a filter for separating the electrical signals corresponding to the reflected reading laser beam from electric signals corresponding to the reflected writing laser beam which are contained in the output signal of said detector.

4. An optical information recording/reproducing apparatus according to claim 1, wherein said frequency is no greater than about five times as high as the maximum frequency of said signal to be recorded.

5. An optical information recording/reproducing apparatus according to claim 1. further including only a single detector for receiving both of said writing laser beam and said reading laser beam reflected by the recording film of said recording medium, and a filter for separating electrical signals corresponding to the reflected reading laser beam from electric signals corresponding to the reflected writing laser beam which are contained in the output signal of said detector.

6. The method of recording and reproducing information or data which is capable of confirming a recorded signal after a signal has been recorded comprising the steps of:

(a) recording a signal on a recording medium by raising the temperature of the recording medium by irradiation with a laser beam;

(b) reproducing the recorded signal by irradiating with a reading laser beam;

(c) passing beams of said writing laser and reading laser through an optical system common to both;

(d) reproducing the signal recorded on the recording medium simultaneously with the recording of the signal so as to confirm that the signal has been recorded; and (e) modulating the intensity of the writing laser beam with a frequency at least about twice as high as the maximum frequency of said signal to be recorded so that the beams of said writing and reading laser are not overlapped.

7. The method of claim 6 wherein said frequency is between about two to five times the maximum frequency of the signal to be recorded.

8. An optical information recording apparatus comprising:

signal recording means for recording a signal on a recording medium by raising the temperature of the recording medium by the use of a writing beam laser having a predetermined wavelength;

signal reproducing means for reproducing said signal by using a reading laser beam which has the same predetermined wavelength as said writing laser beam;

an optical system provided in common to both said writing laser beam and said reading laser beam;

the signal recorded on said recording medium being reproduced simultaneously with the recording of said signal through said signal reproducing means for allowing confirmation of said signal being recorded; and means for modulating the writing laser beam at a frequency of between about twice to five times as high the maximum frequency of the signal to be recorded.

* * * * *